(12) United States Patent
Vandenberg et al.

(10) Patent No.: US 10,353,130 B2
(45) Date of Patent: Jul. 16, 2019

(54) OPTIC HOMOGENIZER

(71) Applicant: Cellomics, Inc., Pittsburgh, PA (US)

(72) Inventors: Dirk John Vandenberg, Pittsburgh, PA (US); Monica Jo Tomaszewski, Pittsburgh, PA (US); Keith Rao Heffley, Pittsburgh, PA (US); Steven Roland Auger, Pittsburgh, PA (US)

(73) Assignee: Cellomics, Inc., Carlsbad, CA (US)

( * ) Notice: Subject to any disclaimer, the term of this patent is extended or adjusted under 35 U.S.C. 154(b) by 69 days.

(21) Appl. No.: 15/504,825

(22) PCT Filed: Dec. 8, 2015

(86) PCT No.: PCT/US2015/064487
§ 371 (c)(1),
(2) Date: Feb. 17, 2017

(87) PCT Pub. No.: WO2016/100013
PCT Pub. Date: Jun. 23, 2016

(65) Prior Publication Data
US 2017/0276857 A1  Sep. 28, 2017

Related U.S. Application Data

(60) Provisional application No. 62/092,405, filed on Dec. 16, 2014.

(51) Int. Cl.
*G02B 6/00* (2006.01)
*F21V 8/00* (2006.01)
(Continued)

(52) U.S. Cl.
CPC ......... *G02B 6/0008* (2013.01); *G02B 6/0061* (2013.01); *G02B 21/08* (2013.01);
(Continued)

(58) Field of Classification Search
CPC ...... G02B 6/00; G02B 6/0008; G02B 6/0013; G02B 6/002; G02B 6/0023; G02B 6/0086;
(Continued)

(56) References Cited

U.S. PATENT DOCUMENTS 4,915,479 A * 4/1990 Clarke ............. G02F 1/133524
349/62
8,403,527 B2 * 3/2013 Brukilacchio ..... G01N 21/8806
362/235

(Continued)

FOREIGN PATENT DOCUMENTS

CN 1413311 A 4/2003
CN 103268016 A 8/2013
(Continued)

OTHER PUBLICATIONS

PCT International Search Report and Written Opinion of the International Searching Authority for PCT/US2015/064487, dated Jun. 29, 2017, 10 pages.

*Primary Examiner* — Thong Q Nguyen
(74) *Attorney, Agent, or Firm* — Workman Nydegger

(57) ABSTRACT

An apparatus and method of delivering a precisely sized, homogeneous field of light within an optical system. The apparatus operates equally well over UV, visible, and NIR wavelengths, over a wide range of input beam divergence and regardless of heterogeneity. A tapered or contoured homogenizing rod that creates an evenly distributed illumination at a target area of specific size.

14 Claims, 13 Drawing Sheets

(51) Int. Cl.
*G02B 27/09* (2006.01)
*G02B 21/08* (2006.01)
*G02B 21/16* (2006.01)

(52) U.S. Cl.
CPC ......... *G02B 21/16* (2013.01); *G02B 27/0927* (2013.01); *G02B 27/0994* (2013.01)

(58) Field of Classification Search
CPC ........ G02B 6/0088; G02B 6/24; G02B 6/241; G02B 6/26; G02B 6/262; G02B 6/36; G02B 6/3616; G02B 7/00; G02B 7/003; G02B 6/0001; G02B 6/0028; G02B 6/0033; G02B 6/0045; G02B 6/0046; G02B 6/005; G02B 6/0058; G02B 6/0061; G02B 7/02; G02B 7/023; G02B 7/026; G02B 27/00; G02B 27/09; G02B 27/0994
USPC ...... 385/31, 33, 34, 39, 58, 88, 89; 359/819, 359/822, 827, 434, 642
See application file for complete search history.

(56) References Cited

U.S. PATENT DOCUMENTS

2005/0237764 A1* 10/2005 Jain ................... F21V 7/0025
362/551
2008/0273837 A1* 11/2008 Margolin ............. G02B 6/3825
385/62
2014/0350368 A1* 11/2014 Irisawa ................ A61B 5/0095
600/342

FOREIGN PATENT DOCUMENTS

| CN | 103904535 A | 7/2014 |
| CN | 205384409 U | 7/2016 |
| JP | 2003518272 | 6/2003 |
| JP | 2005056608 | 3/2005 |
| JP | 2008284030 | 11/2008 |
| JP | 2013-168366 A | 8/2013 |
| WO | 99/39135 A1 | 8/1999 |
| WO | 01/46734 A1 | 6/2001 |
| WO | 2004/063781 | 7/2004 |
| WO | 2012014141 A1 | 2/2012 |
| WO | 2016100013 A1 | 6/2016 |

* cited by examiner

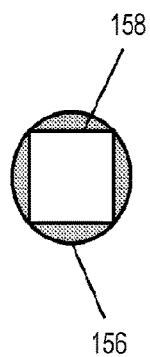 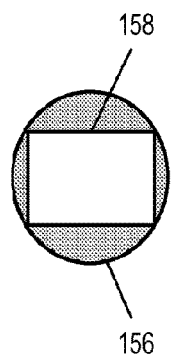 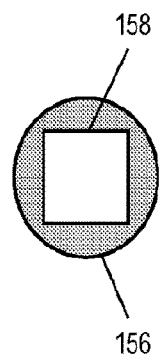 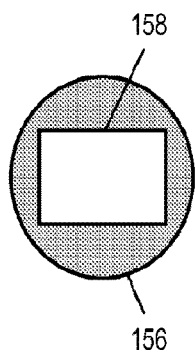
Fig. 3A    Fig. 3B    Fig. 3C    Fig. 3D
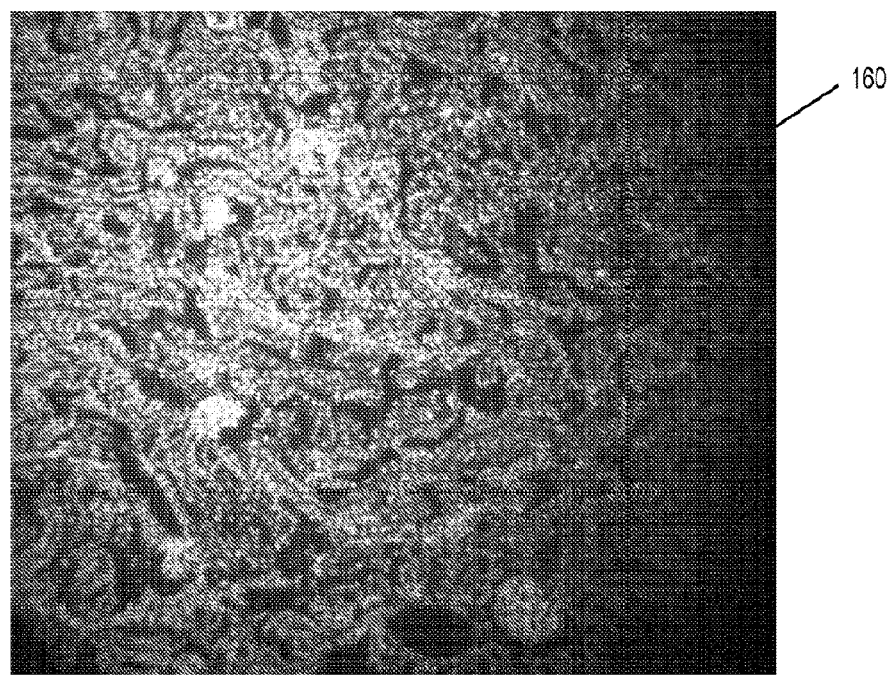
Fig. 4

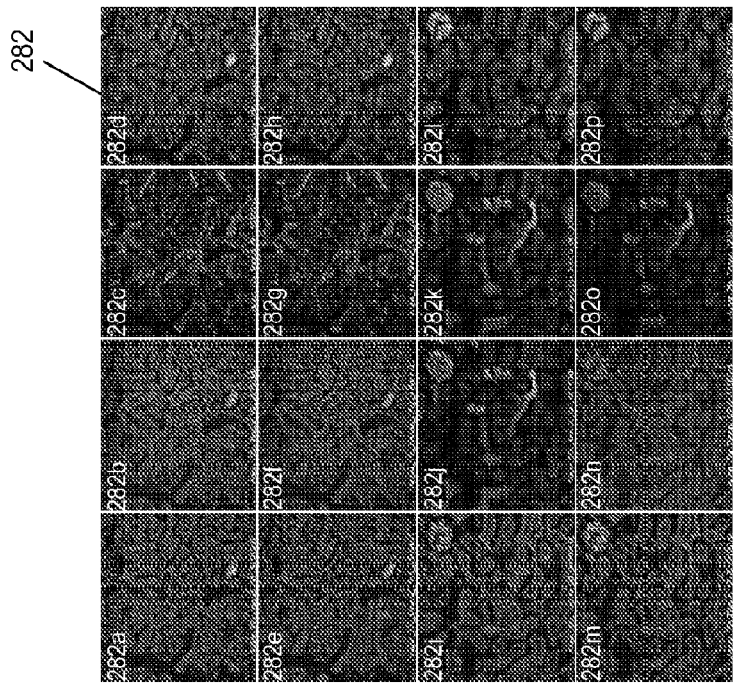
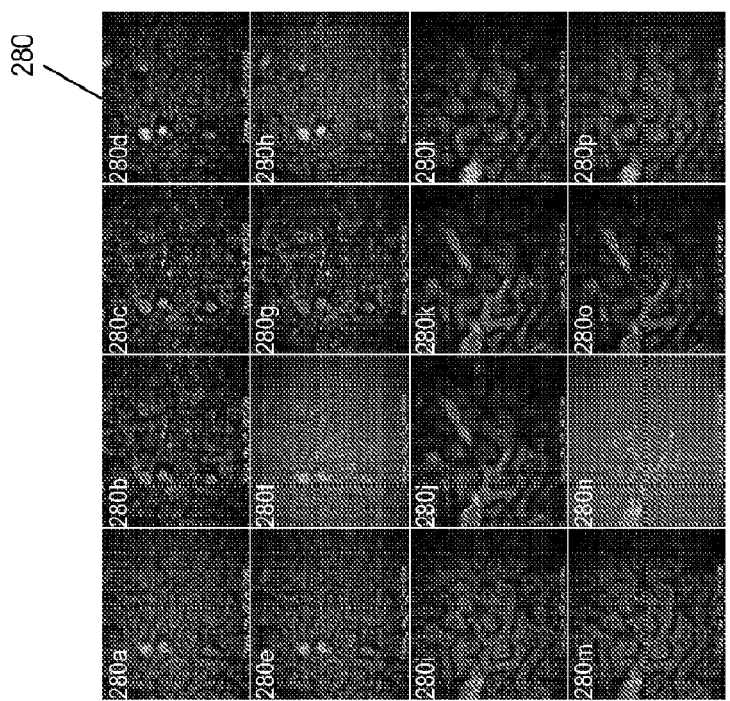
Fig. 16B
Fig. 16A

OPTIC HOMOGENIZER

BACKGROUND

1. Field

The present application relates to systems, devices and methods for propagating fields of light within an optical system. More particularly, the present application relates to producing an output light field from an illumination source such that the output light field has a uniform cross sectional illumination.

2. The Relevant Technology

A growing trend in microscopy over the last decade is the automated imaging of biological samples. Rather than the manual observation of samples, automated microscopy involves computer-controlled automatic selection and digital imaging of sample fields, enabling high throughput imaging of a large number of samples without end-user input.

Automated imaging is often known as HCI (High-Content Imaging) when applied to fluorescently labeled cells with automated quantitative analysis of the acquired images. In particular, HCI is a cell-based screening method that yields detailed information about the temporal-spatial dynamics of cell constituents and processes, and plays an important role in the use of cell-based screening for identification and validation of drug candidates. The information provided by HCI alleviates bottlenecks in the drug discovery process by providing deep biological information. The assays associated with this method use either fixed or live cells, depending on the biological information desired.

HCI is commonly used with cells labeled with fluorescent probes, such as fluorescent ligands, and immunofluorescent probes directed towards particular cellular targets, fluorescent environmental or cell state sensors, or fluorescent protein chimeras endogenously expressed by the cell. One of the benefits of HCI is its multiplexed multispectral capability, where multiple fluorescent probes can be detected, each emitting a fluorescence signal in a different color.

During fluorescent analysis, light from a fluorophore excitation light source is typically guided towards the cells. The excitation light illuminates the cells, which induces fluorophore emission light to be emitted from the cells. The emission light is imaged and analyzed to determine information about the cells. To enable detection of multiple fluorescent probes, the fluorophore excitation light source can provide multiple bandwidths of light.

BRIEF SUMMARY

An apparatus and method of delivering a precisely sized, homogeneous field of light within an optical system. The apparatus operates equally well over UV, visible, and NIR wavelengths, over a wide range of input beam divergence and regardless of heterogeneity. A tapered or contoured homogenizing rod that creates an evenly distributed illumination at a target area of specific size.

In one aspect, an optic homogenizer includes an adapter, an optic window, and a homogenizing rod. The optic homogenizer is configured to receive and homogenize a signal from an optic light guide having an end face. The adapter is configured to receive the optic light guide. The homogenizing rod is positioned between the adapter and the optic window and extends longitudinally from an input end face to an output end face. The area of the output end face is at least three times larger than the area of the input end face. The homogenizing rod tapers from the output end face to the input end face. The optic homogenizer is configured such that when the optic light guide is received by the adapter, the input end face of the homogenizing rod abuts the end face of the optic light guide and the output end face of the homogenizing rod abuts the optic window.

The optic homogenizer can also include a housing in which the adapter, the optic window, and the homogenizing rod are positioned.

The input end face of the homogenizing rod can securely press against the end face of the optic light guide. The output end face of the homogenizing rod can securely press against the optic window.

The output end face of the homogenizing rod can be at least eleven times larger than the area of the input end face of the homogenizing rod.

The input and output end faces of the homogenizing rod can each be shaped in the form of a square or rectangle.

The optic homogenizer can also include means for positioning the homogenizing rod so as to align the input end face with the end face of the optic light guide and the output end face with the optical mirror.

The means for positioning can include a proximal slider and a distal slider that both contact the homogenizing rod.

The means for positioning can include a proximal spring, a middle spring, and a distal spring that work in concert with the proximal and distal sliders to cause the input end face of the homogenizing rod to securely press against the end face of the optic light guide and the output end face of the homogenizing rod to securely press against the optic window.

In one aspect, a high content imaging (HCI) system includes a stage configured to receive a plurality of biological cells, an excitation light source that produces an excitation light, and the optic homogenizer. The optic homogenizer receives the excitation light from the excitation light source and produces a homogenized excitation light therefrom that is used to image the biological cells at the stage.

The excitation light received by the optic homogenizer can have a spot that is circular. The homogenized excitation light can have a spot that is square or rectangular.

The spot size of the homogenized excitation light can be about the same size as the imaged cells.

The optic homogenizer can be slidable within a sleeve to focus the homogenized excitation light at the stage.

In one aspect, an optical excitation adapter includes a critical illumination assembly and an optic homogenizer. The optical excitation adapter has an optical path extending therethrough. The optic homogenizer is optically coupled to the critical illumination assembly. The optic homogenizer includes a homogenizing rod extending longitudinally from an input end face to an output end face. The homogenizing rod tapers between the end faces. The optical excitation adapter is adapted such that (i) an excitation signal received by the optic homogenizer passes through the homogenizing rod to produce a homogenized signal and (ii) the homogenized signal passes through the critical illumination assembly so as to be passed to a sample plane as an image of the homogenized output face of the homogenizing rod.

The critical illumination assembly can include a sleeve into which the optic homogenizer is inserted.

In one aspect, an optical excitation adapter includes a collector assembly, a condenser assembly, and a homogenizing rod. The optical excitation adapter has an input and an output. The collector assembly has one or more collector lenses. The condenser assembly has one or more condenser lenses. The homogenizing rod extends longitudinally from an input end face to an output end face. The homogenizing rod tapers between the input and output end faces. The optical excitation adapter is adapted such that light received at the input of the optical excitation adapter passes through the input and output end faces of the homogenizing rod, the one or more collector lenses, and the one or more condenser lenses and exits the optical excitation adapter at the output.

The homogenizing rod can be housed in a housing. The optical excitation adapter can include a sleeve into which the housing is received and secured.

The housing can be slidable within the sleeve to focus the light that exits the optical excitation adapter.

In one aspect, a method of assembling an optic homogenizer includes steps of inserting a distal positioner, a middle spring, a proximal positioner, and a proximal spring, in that order, into a proximal end of a housing; securing a light guide adapter to the proximal end of the housing; inserting a homogenizing rod, an optic window, and a distal spring, in that order, into a distal end of the housing; and securing a retention cap to the distal end of the housing.

The method can also include a step of inserting a light guide into the light guide adapter.

The light guide can be inserted into the light guide adapter before the light guide adapter is secured to the proximal end of the housing.

The foregoing summary is illustrative only and is not intended to be in any way limiting; the summary is provided to introduce a selection of concepts in a simplified form that are further described below in the Detailed Description. The summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of embodiments described or envisioned herein. The features and advantages of embodiments described or envisioned herein may be realized and obtained by means of the instruments and combinations particularly pointed out in the appended claims. These and other features will become more fully apparent from the following description and appended claims, or may be learned by the practice of embodiments described or envisioned herein as set forth hereinafter.

BRIEF DESCRIPTION OF THE DRAWINGS

Various embodiments will now be discussed with reference to the appended drawings. It should be appreciated that these drawings depict only typical embodiments and are therefore not to be considered limiting of the scope of the application. It should also be appreciated that the drawings are not necessarily drawn to scale and that some of the elements may be drawn merely for clarity sake.

In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") when referring to a specific instance of the element.

FIGS. 3A-3D are block diagrams depicting various illumination spot sizes and corresponding image sizes.

FIG. 4 is an image of a sample showing uneven distribution of illumination.

FIGS. 16A and 16B are sample images.

DETAILED DESCRIPTION

Figure 1:
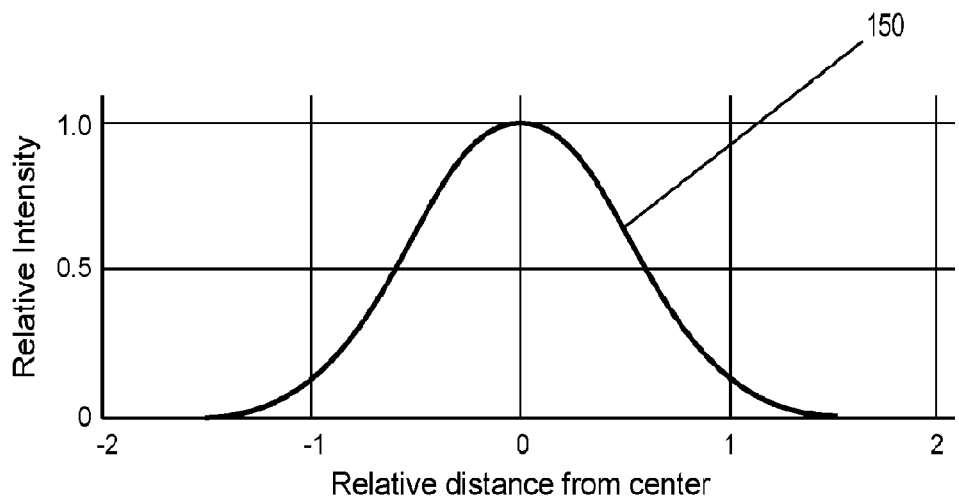
FIG. 1 is an intensity graph of the general shape of the output from a round light guide.

As used in the specification, a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Furthermore, as used in the specification and appended claims, directional terms, such as "top," "bottom," "left," "right," "up," "down," "upper," "lower," "input," "output" and the like are used herein solely to indicate relative directions and are not otherwise intended to limit the scope of the specification or claims.

Embodiments disclosed or envisioned herein may comprise or utilize a special purpose or general-purpose computer including computer hardware, such as, for example, one or more processors, as discussed in greater detail below. Embodiments may also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmission media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., an "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, tablets, mobile telephones, PDAs, pagers, routers, switches, and the like. Embodiments may be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entities data center or "in the cloud." In this specification and in the following claims, a computer system is also defined to include imaging systems (e.g., imaging system 102 in FIG. 11).

Figure 2:
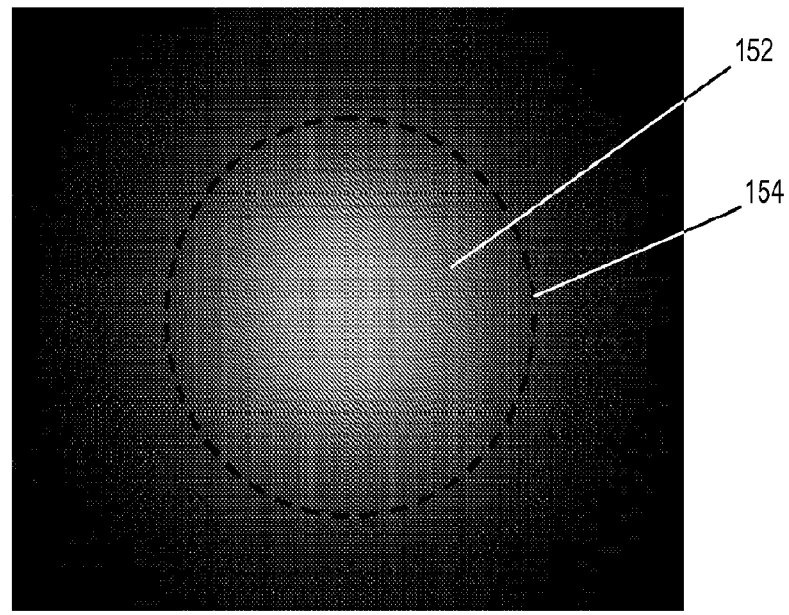
FIG. 2 shows an illuminance diagram of a light beam that exhibits a Gaussian distribution.

In optics, light guides, such as, e.g., liquid and fiber light guides, are used to transmit light beams. A light source, such as, e.g., a laser, a laser diode, an LED, or a filament, collimated when necessary and introduced into the input end of each light guide. Due to the transmission characteristics of light guides, the intensity profile of the light at the output end of each light guide typically has a generally Gaussian distribution. This means that the illumination is brightest at the center and drops off as one moves outward therefrom, as depicted by intensity graph 150 shown in FIG. 1. That is, on the plane of the output end of the light guide orthogonal to the incidence of the light, the intensity of the light peaks at the center and diminishes as one moves away from the center of the illumination. FIG. 2 shows an example of an illuminance diagram of a light beam 152 having such a profile. Light beam 152 is said to have a particular spot size (depicted as dashed line 154)—i.e., beam width—based on this Gaussian distribution.

Such light is often used to illuminate targets or samples for viewing or recording. For example, in a standard critically illuminated microscopy or instrumentation system, source light is condensed—frequently into a collimated beam that is directed through the system in a light guide—and then focused through an objective or condenser onto the target. The illuminated target is then sampled or recorded by a CCD or CMOS based camera, typically using a square or rectangular sensor.

Conventional illumination systems and collection optics provide a circular spot of light 156 at the sample as depicted in FIGS. 3A-3D. Because the sensor is square or rectangular, even if the circular spot 156 of the light beam is optimized to provide illumination that covers just the amount of the target 158 necessary to be recorded, much of the available illumination light is wasted, falling outside the area being imaged by the CCD or CMOS based camera. For example, as depicted by the gray areas in FIGS. 3A and 3B, about 35% of the available illumination light is unused or wasted when using a square sensor—even more is wasted when using a rectangular sensor.

For multi-wavelength optical systems, lensing must accommodate all wavelengths used. As a result, the minimum spot size of illumination light delivered to the target plane must be at least as large as each of the smallest spots created by each of the wavelengths or optics prior to beam combination. This requires a larger spot size at the target— as depicted in FIGS. 3C and 3D—causing even more illumination light to be lost. The severity of the loss depends on specific lens design of the illumination and objective.

Without conditioning, the illumination light in a critical illumination system retains the general Gaussian distribution inherent to the source of light, e.g., the output of the light guide as shown in FIG. 2. This variability in intensity from the center to the corners of the field of view are readily apparent, impacting aesthetics of the image, signal to noise ratios, and spatial continuity of image sets covering target areas larger than the system or objective field of view. FIG. 4 is an actual image sample 160 recorded by one of these standard critically illuminated microscopy systems. Because of the general Gaussian intensity distribution, the center portion of the image is bright while the brightness of the image diminishes towards the edges and is almost nonexistent in the corners, reflecting the problems discussed above.

One standard approach to homogenizing or evenly distributing the illumination light is to increase the spot size so the target field receives only the more evenly distributed intensity near the center of the beam (indicated by dashed line). With high powered lasers, this can be accomplished by enlarging and using the center 10% of the beam as the spot that covers the target, discarding a significant amount of the available light. This requires a significant amount of power because the illumination spot is magnified to apply the smaller center region of the beam to the sampled area, the applied power drops significantly with the magnification increase. It also can have the undesired effect of exciting fluorophores outside of the target area, which contributes to phototoxicity and photobleaching observed in the ensuing stained samples. With non-coherent sources, achieving similar acceptable intensities over the full field of view can create 70% or more loss of total beam power before the beam reaches the target plane. In addition, although the intensity is more even across the center 10% of the beam, the intensity is still not totally even.

Another standard approach is to use aspheric collection lenses. These lenses can help counteract the spatial heterogeneity of the light, as the aspheric curvature of the lensing surface helps to counteract the irregular intensity distribution. Unfortunately, many light sources, such as LED's and filament sources, emit light at very wide angles, requiring large aspheric lenses for optimal collection of light. These larger aspheric lenses are expensive, wavelength specific for optimal effect, and not readily available.

Another deficiency found in many conventional critical illumination systems is source structure retention. That is, the collected light beam can retain structure from the light source used to generate the light beam. This can occur when using just about any light source, including, e.g., lasers, LED's, filaments, or any other sources, collimated or otherwise. The structure can become visible when the light beam is refocused at the sample plane. The illumination can be slightly defocused to make the structure of the light source less apparent, but this can further reduce illumination intensity at the corners of the target viewing area.

Furthermore, conventional illumination systems having multiple wavelength capabilities are bulky systems. For most light sources, e.g., lasers, laser diodes, and LED's, each wavelength is generated by a separate element. The emissions from these elements must be captured, and then combined into a single output for coupling to external systems or optical paths. Filament based sources can cause a lot of heat, thus requiring space for airflow to cool the area surrounding the filament bulb. While these illumination sources can be physically attached or integrated with a main optical core, they are typically decoupled through the use of a flexible liquid or fiber optic light guide. Lenses are used to focus the illumination light into the end of a light guide, and then a coupler is provided to condition the beam exiting the light guide at the entry point to the main optical instrument.

Transmitting light through a light guide over enough distance, e.g., 1-2 meters or greater, can have a significant, but not ideal, homogenization effect so that the structure of the element generating the light is mostly removed from the beam when the beam exits the light guide. However, as discussed above, the exiting beam still has the same circular shape and the approximately Gaussian intensity profile as the light had at the input end of the light guide. Furthermore, for sources that generate a wide range of wavelengths, the entire range of wavelengths must be accommodated, which requires the light guide to have an even larger diameter based on today's practical lens design constraints. For example, for single wavelengths propagating through a core of an optic fiber, the minimum core diameter can be about 6 to 10 microns using today's technology, but for multiple wavelengths the core diameter must be sizably increased for practical use to about 150 to 1,500 microns. And as the fiber size increases, the intensity differential seen from the center to edge of the target area becomes more pronounced.

Users of HCI systems typically demand minimal intensity drop off (e.g., less than about 15%) towards the corners of their field of view. In some cases, the demand can be even higher. For example, in some cases the observed drop off must be negligible (e.g., less than about 5%). These requirements can be challenging for HCI systems to meet. Each illumination source exhibits a different dispersion pattern depending on the principal component generating the light, and the conduits or lensing used to deliver the light to the intended target area. The variability in structure, intensity distribution, and wavelength(s) presents a challenge when an optical designer wants to deliver uniformity, but does not know exactly how irregular the illumination source will be. This makes it difficult to optimize uniformity of illumination at the target area while maximizing transmission efficiency.

To address this issue, some higher quality illumination systems use Koehler illumination. Koehler illumination requires a specific arrangement of lenses and apertures that ensures a spot of perfectly defocused light is delivered to the target area. While Koehler illumination generates an even illumination of the sample and ensures that an image of the illumination source is not visible in the resulting image, it comes at a price. For example, producing Koehler illumination with a square or rectangular spot at the sample plane requires additional optical elements that can significantly increase the optical path length and be quite expensive. In addition, Koehler illumination is less robust than critical illumination, requiring frequent calibration of apertures to ensure that the image of the light source is prevented from reaching the target. And once again, homogeneity comes with reduced efficiency. Furthermore, Koehler illumination produces a circular illumination profile which is clipped either by the CCD as previously described or by an aperture in the illumination optical path. Either way, a 35% or greater loss of intensity can still result due to the circular-square/rectangle mismatch.

A light transmitting rod or light pipe—referred to herein as a "homogenizing rod" or simply a "rod"—of specific geometry can solve one or more of the problems discussed above. The rod applies the physics concept of total internal reflection to convert a light focused into an input end to a more homogenized output light, relatively independent of wavelength. Multiple superimposed total internal reflections occur inside the rod, providing an effect comparable to the homogenization achieved by a light guide, but without a central intensity peak. In addition, the homogenizing rod has less loss and requires less space than a flexible guide. The rod is also much easier to mount and align than a light guide or large aspheric lenses. Spatial structure in the light is removed and the output of the homogenizing rod has very high spatial uniformity relative to the "Gaussian-like" output of a liquid or fiber optic light guide. Furthermore, the shape of the rod can match the square or rectangular shape of the CCD or CMOS imager.

Figure 5A:
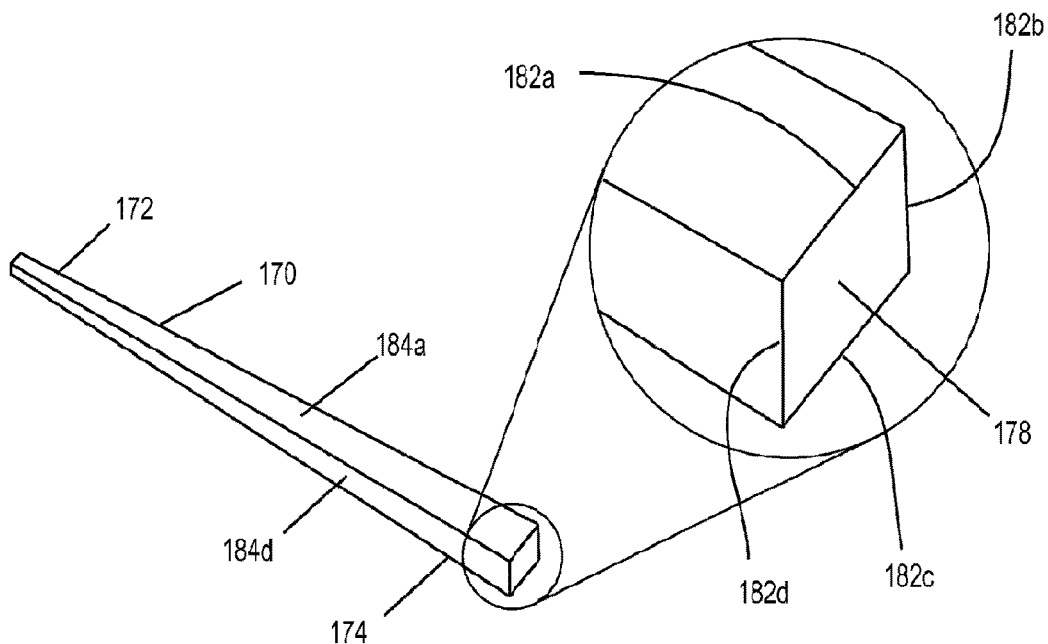
FIGS. 5A and 5B illustrate an example embodiment of a homogenizing rod incorporating features disclosed or envisioned herein.
Figure 5B:
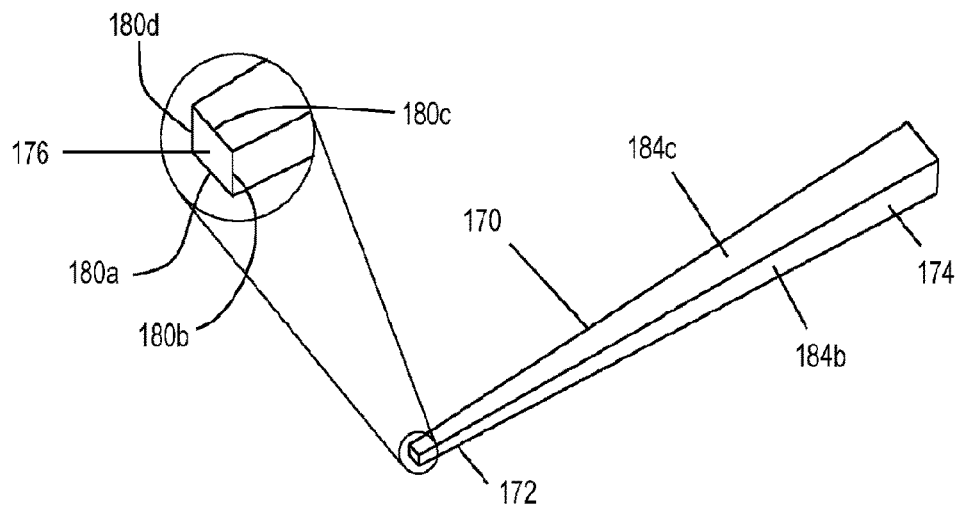

FIG. 5 depicts a homogenizing rod 170 according to one embodiment. Homogenizing rod extends longitudinally between an input end 172 and an output end 174. An input end face 176 and an opposing output end face 178 are respectively positioned at the input and output ends 172, 174. Input and output end faces 176 and 178 have a similar shape to each other, in this case a square. Other shapes, e.g., a rectangular, can also be used based on the desired shape of the field of view. In one embodiment the shape is selected to match the shape of the recording sensor. To form the square, input end face is bounded by four edges 180 (180a-180d) of equal length and output end face 178 is bounded by four edges 182 (182a-182d) of equal length. The lengths of edges 182 of output end face 178 are greater, and in some cases much greater, than the lengths of edges 180 of input end face 176. Thus, while both end faces have the same shape, they have different sizes; the area of output end face 178 is larger, and in some embodiments much larger, than the area of input end face 176. This size mismatch can provide many benefits, as discussed below. If desired, however, both end faces can have the same size; but many of the benefits of the size mismatch may be lost Homogenizing rod 170 further comprises a plurality of side faces 184 (184a-184d), each extending longitudinally between input and output ends 172 and 174. Each side face 184 extends longitudinally from a different edge 180 of input end face 176 to a corresponding edge 182 of output end face 178, and laterally between adjoining side faces. As such, homogenizing rod 170 is in the form of a truncated pyramid having a square cross section that tapers from the output end 174 to the input end 172.

The shape of homogenizing rod 170 has been designed to efficiently provide evenly distributed intensity for a square field of view. Because rod 170 has a square output end face 178, the light output therefrom has a square profile so that downstream optics can transmit a light focused into a square shape without further manipulation. This by itself increases the efficiency of the system by at least 35% because the wasted light inherent with circular illumination light on square fields of view—discussed above with respect to FIGS. 3A and 3C—is no longer present. When a rectangular field of view is desired, a corresponding rectangular shaped output end increases the efficiency of the system by an even greater amount, as discussed above.

Since the rod relies upon total internal reflection (TIR) the rod can introduce significant loss due to the limitations of total internal reflection for highly divergent light beams. To compensate for the TIR limited efficiencies, the cross sectional size of input end 172 can be made to be the smallest size capable of capturing the input light. In one embodiment that size corresponds to the size of the input fiber. For example, when using a conventional single-mode fiber as the input, the lengths of edges 180 of input end face 176 can be between about 7 microns and about 10 microns and when using a conventional multimode fiber as the input, and the lengths of edges 180 can be between about 80 microns and about 2,000 microns.

To further increase efficiency of TIR, the cross sectional size of output end 174 of rod 170 can be larger, and in some cases much larger, than the size of input end 172 (i.e., the area of the input end face can be greater than the area of the output end face). This increases the amount of light that can be reflected internally. In one embodiment the size of the output end face can be about the same size as the desired field of view and/or the recording sensor. By balancing the size of the output end face with the size of the field of view to be illuminated at the target, lenses downstream from rod can be selected to provide optimal throughput rather than based on the amount of magnification required to fill the target area, as is done in conventional systems. This further increases the efficiency of the system, and avoids accentuating inherent irregularities to the distribution of light. While use of a tapered rod (i.e., a bigger output face than input face) reduces the numerical aperture (NA) of light that exits rod 170, this can be advantageous, as lower NA light is much easier to effectively collimate and deliver to the objective.

Homogenizing rod 170 can be as short as 5 mm and as long as desired. In some embodiments, homogenizing rod 170 can be between 30 mm and 200 mm in length, with 40 mm to 100 mm being preferred. Other lengths are also possible. In general, longer lengths provide better homogenized light, but exhibit a higher loss while shorter lengths retain better overall intensity but are not as homogeneous. The length of each edge of the input end face can be between about 0.005 mm and about 15 mm with about 1 mm to about 3 mm being preferred. Accordingly, the area of the input end face can be between about 0.000025 mm$^2$ and about 225 mm$^2$, with about 1 mm$^2$ to about 9 mm$^2$ being preferred.

The length of each edge of the output end face can be between about 0.32 mm and about 32 mm with about 1 mm to about 10 mm being preferred. Accordingly, the area of the output end face can be between about 0.1 mm$^2$ and about 1,000 mm$^2$, with about 1 mm$^2$ to about 100 mm$^2$ being preferred. Other areas are also possible. In addition, the area of the output end face can be between about 1 and about 1,000 times the area of the input end face with about 1 to about 10 times being preferred. In one embodiment the area of the output end face is at least 3 times larger than the area of the input end face. In one embodiment the area of the output end face is at least 11 times larger than the area of the input end face.

Some homogenizing rod geometries may not provide high efficiency results, but each unique system design can incorporate specific tapers, lengths, and end face sizes for high efficiency. Parabolic or spherical entry and exit surfaces may also be used, and may enable reduced lensing downstream of the homogenizing rod Homogenizing rod 170 is comprised of a material through which light can pass, yet has a high internal reflectivity. By way of example, glass, plastic, and the like can be used. For example, Fused Silica and N-BK7 are two common glass materials that can be used for homogenizing rod 170. Other materials are also possible. If desired, the side faces 184 of homogenizing rod 170 can be coated with a reflective material to keep stray light from entering the light path that could possibly affect the illumination pattern, although this is not required. Alternatively or in conjunction, a shroud may be used, such as that discussed below. But this is also not required.

When a circular light beam is input through input end face 176, the light propagates longitudinally through rod 170 to output end 174, reflecting internally as it contacts side faces 184. A prismatic effect occurs as a result of the internal reflections, causing the resulting exiting light beam profile (at a pupil plane) to consist of an array of multiple images of the input light beam which are defocused and distributed (at the sample or target plane).

Figure 6A:
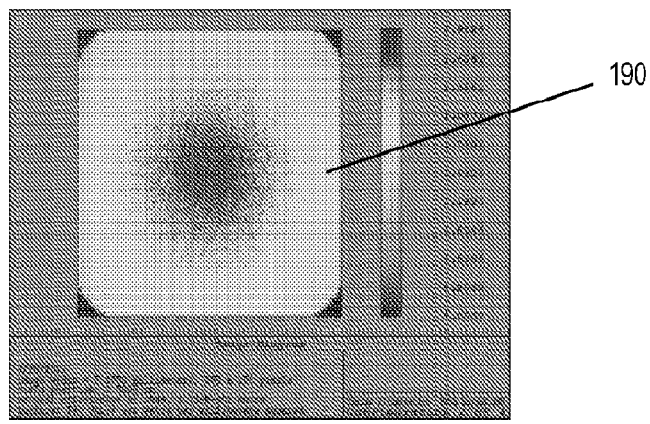
FIGS. 6A-6C depict intensity profiles of a light beam at various planes.
Figure 6B:
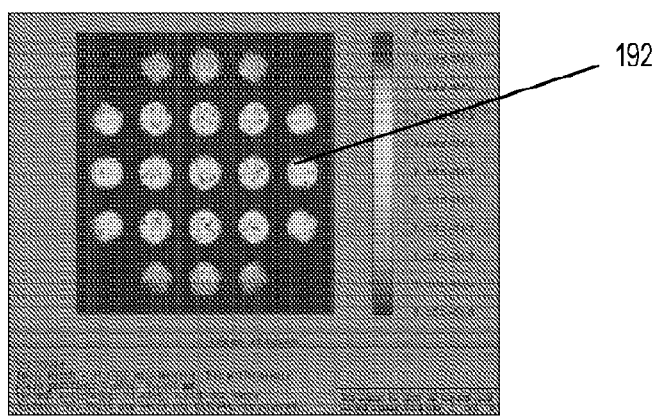
Figure 6C:
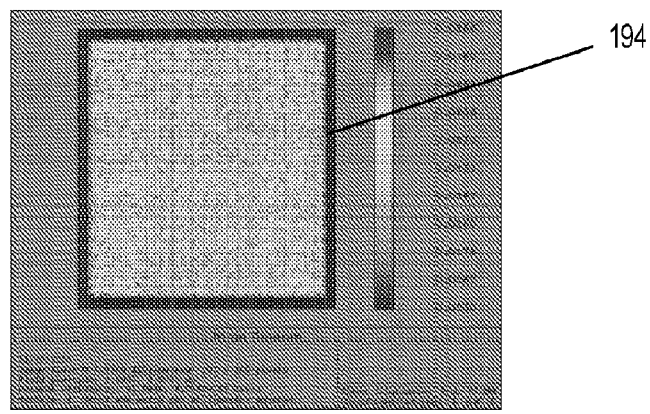
Figure 7:
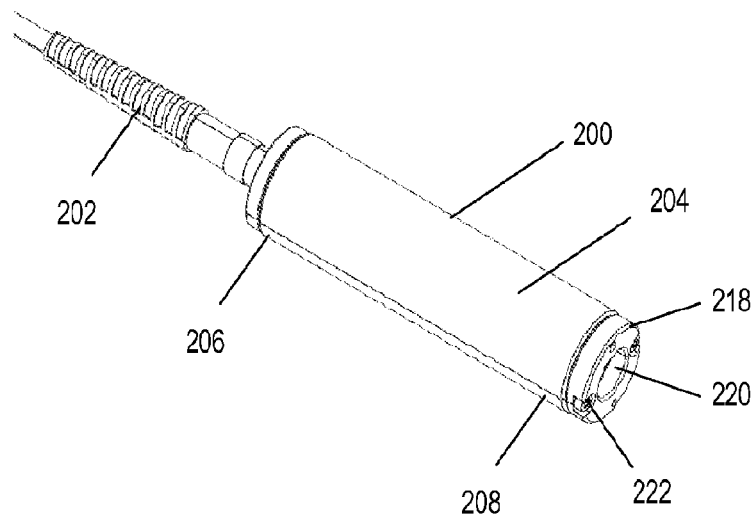
FIG. 7 is a perspective view of an example embodiment of an optic homogenizer incorporating features disclosed or envisioned herein.

FIGS. 6A-6C show an example of the multiple reflections. FIGS. 6A and 6B depict intensity profiles of a light beam as the light beam propagates through and out of homogenizing rod 170 in a critical illumination scheme. As shown in FIG. 6A, the light beam exhibits a generally Gaussian profile 190 when it enters rod 170 at input end face 176. After propagating through rod 170, the light exits the rod through output end face 178, exhibiting profile 192 shown in FIG. 6B. Furthermore, the rod's output pupil plane profile includes multiple images of the input light beam in a 3×3 array (for this specific rod geometry) as shown in FIG. 6B. Of note, each of the images in the array exhibits a similar intensity as the other images in the array. As such, the output plane profile 192 shows a more even distribution of intensity than the input end face profile 190 and does not exhibit the same type of central intensity peak.

The exiting light propagates away from output end face 178 and travels through standard critical illumination optics to a sample plane positioned beyond the output end face, the array images mixing and merging with each other at the sample plane. At the sample plane, the light beam exhibits the intensity profile 194 shown in FIG. 6C, matching the size and shape of the output end face. As depicted, sample plane profile 194 no longer includes an array of images. Instead, sample plane profile 194 has a very high uniformity, with an intensity level evenly distributed across the entire profile. In addition, the size and shape of rod 170 has caused the output light beam at the sample plane to have an illumination spot size and shape that matches the size and shape of the output end face. Thus, rod 170 has converted a small, circular, input light beam having a highly non-homogenized intensity profile into a larger, square, output beam having a highly homogenized profile and matching the usable imaged area.

As a result, the output light beam can provide a more even illumination to illuminate a target than the input light beam and can be optimized to provide illumination to only the amount of target necessary to be recorded by the square sensors of the recording cameras, resulting in greater efficiency. Therefore, the overall signal intensity provided by the original light source can be less, thus requiring less power to produce it.

As indicated above, homogenizing rod 170 has less loss and requires less space than other devices conventionally used to homogenize illumination light. In addition, rod 170 can achieve this effect within tens of millimeters, instead of meters. Using the uniform output of homogenizing rod 170 in a critical illumination scheme results in very high uniformity at the sample plane with an illumination spot size and shape matching the rod's output end face 178. As reflected below, even though the output has very low uniformity at pupil planes (angle space) as seen in FIG. 6B, the uniformity at the sample plane is very high as seen in FIG. 6C.

For the homogenizer rod to work properly, it must be aligned with an input light source. In one embodiment, the light source provides the light signal to the rod, either directly or through lenses, mirrors and other optical devices. For example, an LED used as a light source can be secured to the input end face of the rod by adhesive, clamp, connector, or other securing method so as to directly provide the light signal to the rod. In another example, the signal from the LED can use collecting lenses and mirrors to cause the LED light to become incident on the input end face of the rod. This can be done, e.g., in a similar manner as is presently done to focus the LED light on the end of a multimode light guide.

Figure 8:
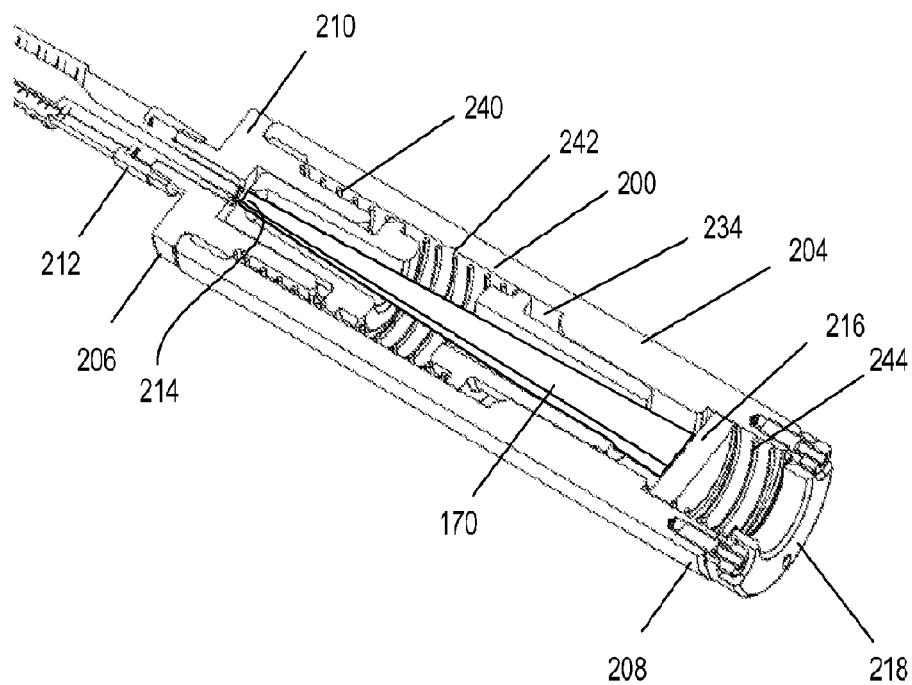
FIG. 8 is a cross-sectional view of the optic homogenizer of FIG. 7.

In another embodiment, a light guide is used to carry a light beam to the rod. FIGS. 7-10 depict an optic homogenizer 200, according to one embodiment, configured to receive an input light beam from a light guide 202, such as a fiber optic cable. Optic homogenizer 200 comprises a hollow, generally cylindrical housing 204 in which a homogenizing rod can be positioned. Housing 204 extends longitudinally from a proximal end 206 to a distal end 208. A light guide adapter 210, such as, e.g., a fiber optic adapter, is positioned at proximal end 206 of housing 204. Adapter 210 is shaped and sized to receive and releasably secure the light guide. As shown in FIG. 8, adapter 210 is configured to receive a fiber optic connector 212 having an exposed end face 214 of the fiber 202. Adapter 210 can be attached to housing 204 by any desired attachment means, such as by threaded connection, bayonet connection, press fit connection, adhesive, or the like. In the depicted embodiment, adapter 210 and housing 204 have mating threads (not shown) so that the adapter can be secured to the housing thereby.

An optic window 216 is positioned at distal end of housing 204. Optic window 216 is a generally disc-shaped piece of glass or plastic through which a light beam can pass. For optimal performance, optic window can have the same or similar index of refraction as homogenizing rod 170.

A homogenizing rod, such as homogenizing rod 170 discussed above, is positioned within housing 204 between adapter 210 and optic window 216 so that input and output end faces 176 and 178 of rod 170 respectfully abut or directly contact light guide end face 214 and optic window 216 when light guide connector 212 has been received within adapter 210. As a result, in a similar manner to that discussed above, a varying intensity circular light beam from light guide 202 can enter homogenizing rod 170 through input end face 176, and be converted to a more evenly distributed, larger, square or rectangular light beam that exits homogenizing rod 170 through output end face 178 and passes through optic window 216. If desired, an index matching gel can be used at the input and/or output ends of rod 170 to increase efficiency between input end face 176 and light guide end face 214 and between output end face 178 and optic window 216. Housing 204 can act as a shroud around homogenizing rod 170 to prevent stray light from entering the light path that could possibly affect the illumination pattern. As discussed above, side faces 184 of rod 170 can alternatively, or in conjunction with the shroud, include a coating.

The optic window provides a unique benefit. It can be used to secure homogenizing rod 170 within housing 204 while allowing light from the entire output face of the homogenizing rod to pass therethrough. A spring or the like can be used to aid optic window 216 in securing homogenizing rod 170, as discussed below. In addition, the optic window can be used by a user to manipulate rod 170 without directly handling the rod. Any oil or other material inadvertently transferred by direct contact to rod 170 might detrimentally affect the performance of the rod, due to changes in the reflection properties thereof. Thus, being able to manipulate the rod without direct contact can be very beneficial. A non-optic clip can be used instead of optic window 216, but many of the benefits of using the optic window may be lost.

A cap 218 is positioned at distal end 208 of housing 204 to retain the various components within the housing. Cap 218 bounds an aperture 220 extending completely therethrough. As a result, after passing through optic window 216, the exiting light beam can pass through aperture 220 to exit optic homogenizer 200. Cap 218 can be attached to housing 204 by any desired attachment means, such as by threaded connection, bayonet connection, press fit connection, adhesive, or the like. In the depicted embodiment, cap 218 is attached to housing 204 using threaded screws 222.

Optic homogenizer 200 further comprises means for positioning the homogenizing rod with respect to light guide 202. The means for positioning the rod can align rod 170 axially with light guide connector 212 and/or position rod 170 longitudinally so that input end face 176 abuts and presses against light guide end face 214. For purposes of the discussion herein, axial alignment of rod 170 with light guide connector 212 means that the optical axes of rod 170 and light guide connector 212 are aligned with each other.

To align rod 170 axially, a pair of positioners 230, 232 are used. Positioners 230 and 232 respectively position the input and output ends 172 and 174 of homogenizing rod 170 so that the optical axes of homogenizing rod 170 and light guide connector 212 align with each other, as depicted in FIG. 8. Positioners 230, 232 can be differentiated by referring to them respectively as proximal positioner 230 and distal positioner 232.

Each positioner is sized to remain at the same axial position within housing 204, independent of longitudinal movement of the positioner. As such, each positioner is generally cylindrical in shape and is positioned within a corresponding cylindrical bore 234 within housing 204. Each positioner is hollow to allow rod 170 to pass therethrough. Proximal and distal positioners 230 and 232 respectfully contact and secure the input and output ends 172 and 174 of rod 170 to axially center rod 170. As a result, rod 170 can remain axially aligned with light guide connector 212.

This can be done in a number of ways. For example, in one embodiment one or more arms are use. At the proximal and distal ends, respectively, of proximal and distal positioners, one or more arms can extend radially inward toward rod 170. The arms are sized and positioned to contact rod 170 to center it axially. The number of arms can vary for each positioner. In another embodiment, a circular end wall can be used instead of arms. The circular end wall can extend radially inward on one or both positioners to contact rod 170. In one embodiment the cylindrical wall itself can contact rod 170. In the depicted embodiment, proximal positioner 230 employs a plurality of arms, and distal positioner 232 uses the cylindrical wall itself.

To position rod 170 longitudinally, a plurality of springs are used. In the depicted embodiment, a proximal spring 240, a middle spring 242, and a distal spring 244, are used. Distal spring 244 is positioned distal of optic window 216 and pushes optic window 216 proximally against output end face 178 of homogenizing rod 170. This proximal force extends through homogenizing rod 170 so that input end face 176 pushes against light guide end face 214. As such, the single distal spring 244 can be used without the other springs, if desired.

However, it is often desired to have minimal contact force at a light guide end face to improve optical connection therewith. Thus, it may be desired to minimize the contact force between homogenizing rod 170 and light guide 202 while maintaining a larger force pushing optic window 216 against output end face 178 of rod 170. One way to do that is to use proximal and middle springs 240 and 242 to absorb some of the input force caused by distal spring 244. In the depicted embodiment, proximal and middle springs 240 and 242 are positioned within housing 204 in such a manner as to respectively cause pushback distal forces against proximal and distal positioners 230 and 232. In one embodiment, the pushback distal forces, combined, are approximately equal to the proximal force exerted by distal spring 244 so that input end face 176 of rod 170 abuts but does not push against end face 214 of light guide 202. In one embodiment, the pushback distal forces, combined, are less than the proximal force exerted by distal spring 244 so that input end face 176 of rod 170 pushes slightly against end face 214 of light guide 202.

Other manners of positioning homogenizing rod 170 are also possible.

Figure 9:
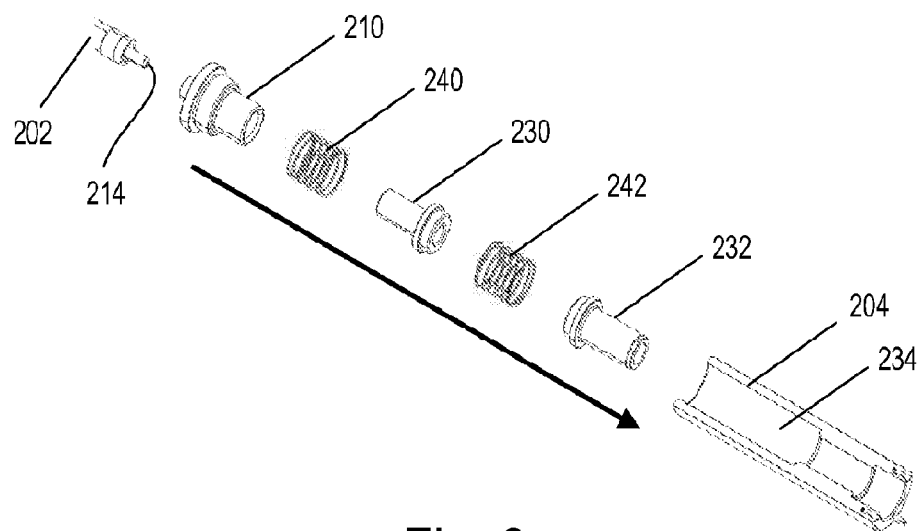
FIGS. 9 and 10 illustrate an example embodiment of a method of assembling the optic homogenizer of FIG. 7.
Figure 10:
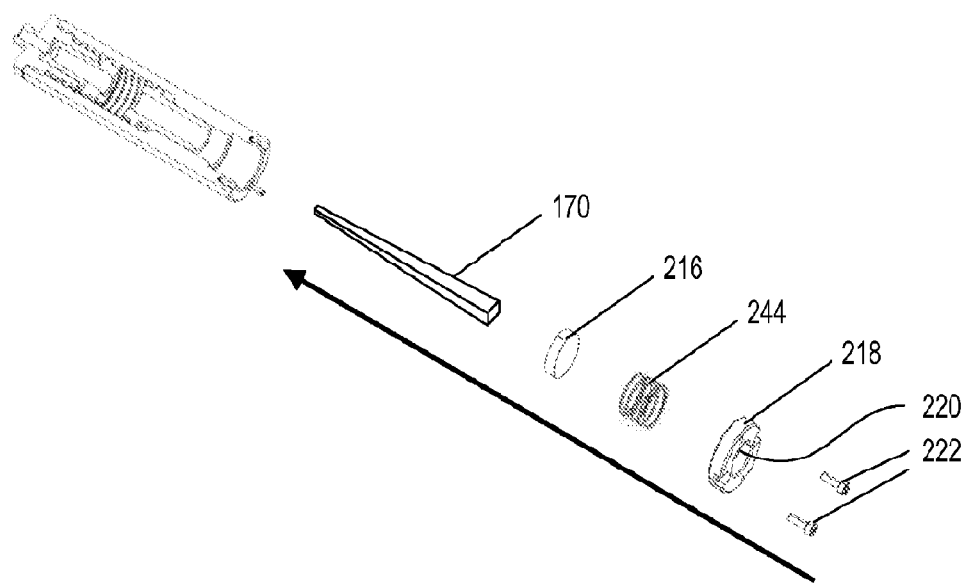

FIGS. 9 and 10 show a method of assembling optic homogenizer 200, according to one embodiment. As shown in FIG. 9, distal positioner 232, middle spring 242, proximal positioner 230, and proximal spring 240 are inserted, in that order, into the proximal end of housing 204. Then, adapter 210 is secured to the proximal end of housing 204, e.g., by threaded connection. As shown in FIG. 10, once adapter 210 has been secured to housing 204, homogenizing rod 170, optic window 216, and distal spring 244 are inserted, in that order, into the distal end of housing 204. Then, retention cap 218 is secured to the distal end of housing 204, e.g., using threaded fasteners. Once assembled, optic homogenizer 200 is ready to receive the end of a light guide 202 via adapter 210. In some embodiments, optic homogenizer 200 is not assembled until a light guide has already been received within adapter 210.

Figure 11:
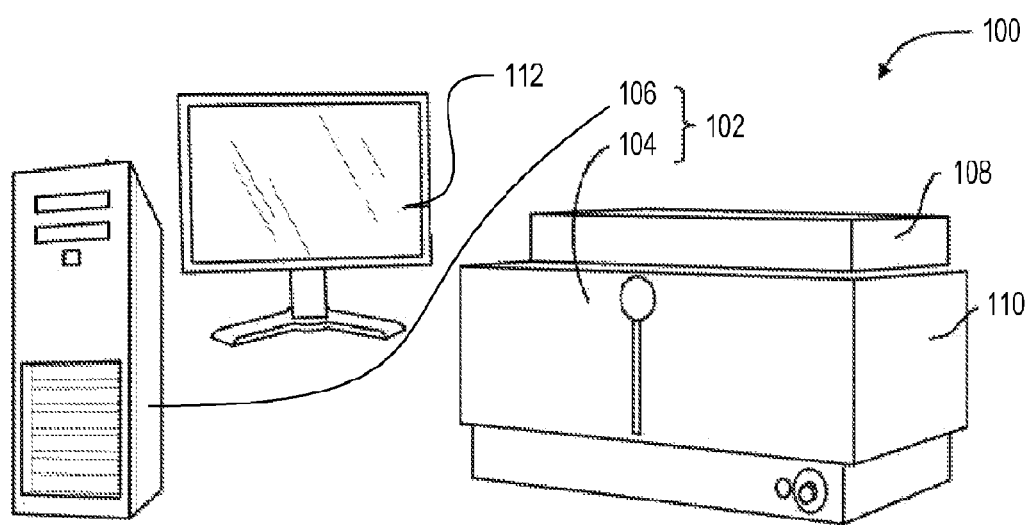
FIG. 11 illustrates an example embodiment of a system incorporating features disclosed or envisioned herein.

FIG. 11 illustrates an exemplary system 100 in which a homogenizing rod and/or optic homogenizer disclosed or envisioned herein can be used. At the heart of the system is a quantitative high-content cell imaging system 102 in which biological cells are scanned and analyzed. The exemplary cell imaging system 102 includes, but is not limited to, an imaging device 104 and a computing device 106.

Imaging device 104 comprises a stage housing 108 mounted on a microscope assembly 110. Stage housing 108 is configured to house the components required to position a specimen plate (such as, e.g., a 96-well plate) or a slide containing cells so microscope assembly 110 can image the cells to allow high content screening of the cells to be performed, as is known by one skilled in the art. Analyzing and storing of the data obtained from the imaging can be performed by imaging device 104 in conjunction with computing device 106.

Computing device 106 can be used as a controller for the system as well as for performing, by itself or in conjunction with imaging device 104, the analysis and/or storage of data obtained by imaging device 104. Computing device 106 can comprise a general purpose or specialized computer or server or the like, as defined above, or any other computerized device. Computing device 106 can communicate with imaging device 104 directly or through a network, as is known in the art. In some embodiments, computing device 106 is incorporated into imaging device 104.

System 100 can also include a user display device 112 to display results and/or system configurations. Imaging device 104 and/or computing device 106 can communicate, either directly or indirectly, with user display device 112.

The optical configurations generally arranged in imaging device 104 produce an enlarged image of cell(s) on a camera in order to record a high resolution image of the cell samples. In particular, the configurations discussed herein provide for a system that not only enables "wide-field" microscopy, as known to those skilled in the art, but also enables optical sectioning capabilities. This can include, e.g., standard confocal microscopy of a focused point or line of illumination scanned over a range of cells. These capabilities can be coupled with imaging algorithms which aid in providing the desired images as recorded by the camera.

In one embodiment, one or more of the method steps described herein are performed as a software application. However, embodiments are not limited to this and method steps can also be performed in firmware, hardware or a combination of firmware, hardware and/or software. Furthermore, the steps of the methods can exist wholly or in part on imaging device 104, computing device 106, and/or other computing devices.

An operating environment for the devices of the system may comprise or utilize a processing system having one or more microprocessors and system memory. In accordance with the practices of persons skilled in the art of computer programming, embodiments are described below with reference to acts and symbolic representations of operations or instructions that are performed by the processing system, unless indicated otherwise. Such acts and operations or instructions are referred to as being "computer-executed," "CPU-executed," or "processor-executed."

Figure 12:
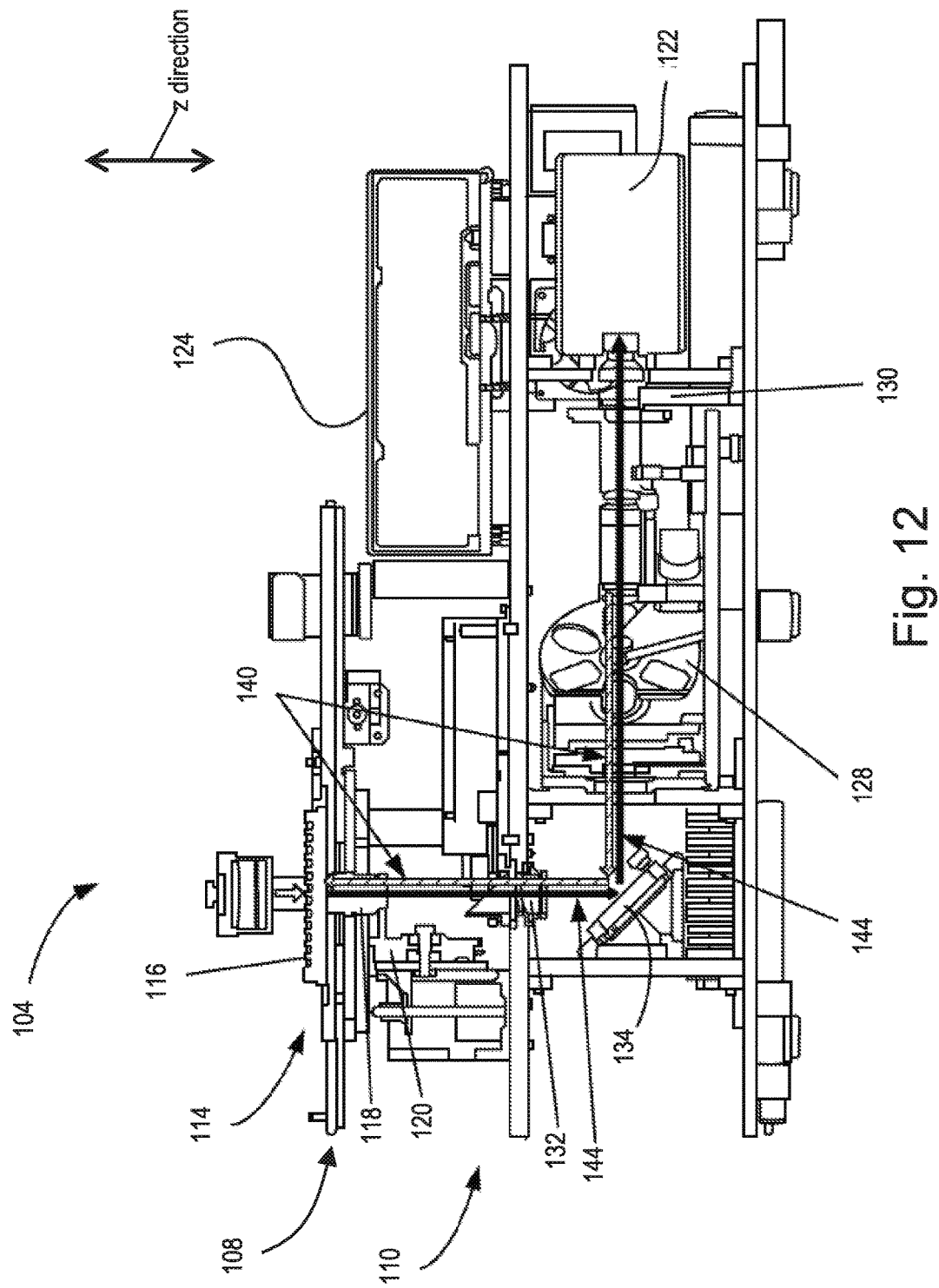
FIG. 12 is a cross-sectional view of an example embodiment of a cell imaging device.
Figure 13:
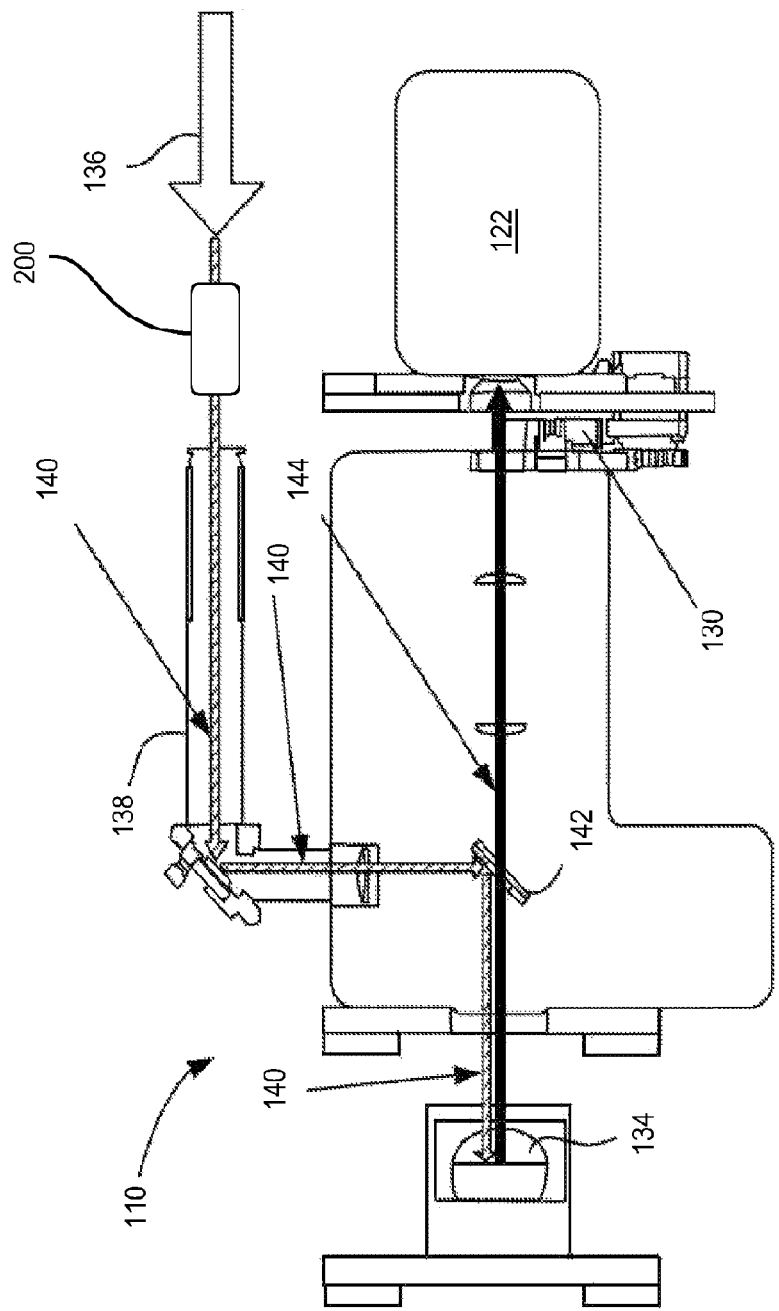
FIG. 13 is a simplified cross-sectional top view of the cell imaging device of FIG. 12.

FIGS. 12 and 13 respectively depict side and top views of an exemplary embodiment of imaging device 104. FIG. 12 displays a general cross-sectional side view of an interior platform design. In general, imaging device 104 integrates components required to position an HCS sample plate 116 containing biological cells so microscope assembly 110 can perform high content screening of the biological cells.

Stage housing 108 comprises a stage assembly 114 mounted in a manner so as to optically and mechanically cooperate with components that make up microscope assembly 110. Stage assembly 114 generally includes a stage on which HCS sample plate 116 can be positioned, as well as a stage positioning mechanism for selectively moving the stage for viewing, as is known in the art.

In the depicted embodiment, microscope assembly 110 houses an inverted microscope that can be used to perform screening of specimens on specimen sample plate 116 from underneath the specimens. The microscope includes an objective assembly 118 comprising a plurality of objectives, as is known in the art, to obtain magnified views of the specimens. Each objective can correspond to a different magnification level. In one embodiment at least three standard objectives are included. Additional objectives can also be included, if desired. Example standard objectives can include 10×/0.4 NA, 20×/0.45 NA and 40×/0.6 NA optical specifications. Example additional objectives can include 2×/0.08 NA, 4×/0.16 NA and 20×/0.7 NA optical specifications. Other magnification levels and objective types can also be used.

The microscope also includes a focus drive mechanism 120 mechanically coupled to microscope objective assembly 118. Objective assembly 118 can be moved up and down (i.e., in the z direction) with respect to stage assembly 114 via focus drive mechanism 120 so as to align and focus any of the objectives of microscope objective assembly 118 on the biological cells disposed within specimen sample plate 116. Focus drive mechanism 120 can be configured with a stepper motor and screw/nut combination that reduces anti-backlash to provide a resolution of, e.g., down to 0.006-μm/microstep to support the microscope objectives configured in imaging device 104.

Although the discussion herein is geared toward the use of an inverted microscope configuration, it is to be appreciated that a non-inverted microscope configuration can alternatively be used to perform screening from above the cells. Moreover, although microscope assembly 110 discussed herein is custom made, other conventional microscope configurations can be incorporated when desired, such as for example, an Axiovert 200M manufactured by Carl Zeiss MicroImaging, Inc. in Goettingin, Germany. In some embodiments, a microscope is not required at all.

Microscope assembly 104 also comprises various known components used to generate and record images of the specimens obtained through the objectives. These components can include, but are not limited to:

an image recorder 122 such as, e.g., a monochrome CCD or CMOS camera,
a fluorophore excitation source 124 such as, e.g., a light engine comprising multiple light emitting diodes (LEDs),
optical filters that filter the excitation and emission lights, such as, e.g., a multi-position dichroic filter wheel 128 and a multi-position emission filter wheel 130, and
light directing devices that direct the excitation and emission lights through the microscope assembly, such as, e.g., a telan lens 132, a fold mirror 134 (e.g., a 90-degree fold mirror), and one or more light tubes.

One or more of the above components are typically controlled by the computing device 106 to allow for automated imaging. The optical configuration generally arranged in imaging device 104 can produce an enlarged image of cell(s) on image recorder 122 so that a high resolution image of the cell samples can be recorded. In particular, the configurations discussed herein provide for a system that not only enables "wide-field" microscopy, as known to those skilled in the art, but also enables optical sectioning capabilities.

In one embodiment, telan lens 132 is a Near-Infrared (NIR) enhanced lens (e.g., an Olympus Triplet) designed for enhanced performance of imaging device 104 over the full range of the visible spectrum from blue to NIR when using any of the configured objectives with desired emission wavelengths, to be discussed below.

Microscope assembly 104 can include an optic homogenizer, such as optic homogenizer 200, to convert excitation light into an excitation light beam having a more evenly distributed illumination intensity and having a shape that matches that of the recorded field of view. In addition, the size of the output end face can be selected to match the size of the recorded field of view.

For fluorescent analysis, fluorophore excitation source 124 produces an excitation light used to illuminate the cells and cause the cells to induce a fluorophore emission light. As the excitation light passes through the system, the excitation light has a generally circular shape exhibiting a generally Gaussian intensity. Fluorophore excitation source 124 can be a multi-LED light engine that works cooperatively with configured excitation filters provided by dichroic filter wheel 128 and emission filter wheel 130, both of which can be computer driven to select a desired filter. The excitation light from fluorophore excitation source 124 can be passed through the optic homogenizer to convert the excitation light into a more efficient light, e.g., in the manner discussed above.

As a general method of operation, fluorophore excitation source 124 can be automatically or manually directed to provide multiple bandwidths of light ranging from violet (e.g., 380 nm) to near infrared (e.g., at least 700 nm) and are designed to excite fluorophores, such as, e.g., cyan fluorescent protein (CFP) and Far Red (i.e., near-IR) fluorophores.

Using system 100, fluorescent analysis of cells can be performed. To perform the analysis, stage assembly 114 first moves sample plate 116 to a position in which a desired particular segment of a micro-well or particular segment of a slide is in a given light path.

The top view depiction of FIG. 13 further illustrates the epifluorescent pathway of example components within microscope assembly 110. As depicted in FIGS. 12 and 13, fluorophore excitation source 124 emits a light beam having a desired system wavelength bandwidth that is relayed by a fiber optic delivery system, (as shown by large directional arrow 136 in FIG. 13), dependent on the application with respect to the fluorescently labeled cells in sample plate 116. The circular, generally Gaussian shaped excitation light beam is received and converted by optic homogenizer 200, e.g., in the manner discussed above, into a larger, square-shaped excitation light beam having an evenly distributed intensity.

The homogenized excitation light beam is guided by an illumination adaptor 138 using various optics so as to be further directed along an excitation light path 140 (as denoted in FIGS. 12 and 13 by the arrows containing slashes) until received by a desired dichroic component 142 (shown in FIG. 13) disposed in the multi-position dichroic filter wheel 128. Dichroic component 142 is designed and automatically software selected for the particular bandwidth of wavelengths provided by fluorophore excitation light source 124. Dichroic component 142 directs the homogenized excitation light beam to 90-degree fold mirror 134. Thereafter, as shown in FIG. 12, the homogenized excitation light continues upward along excitation light path 140 through telan lens 132 and objective assembly 118 to the cells disposed in sample plate holder 116.

The homogenized excitation light induces fluorescence in the cells disposed in sample plate holder 116. The induced fluorescence is returned from the cells via the epifluorescent arrangement back along a path 144 (shown by the dark arrows in FIGS. 12 and 13) through objective assembly 118 and telan lens 132 until received by 90-degree fold mirror 134. As particularly shown in FIG. 12, fold mirror 134 directs the induced fluorescent light back to dichroic component 142, which allows the induced fluorescent light to continue back along path 144 through, e.g., additional optical components. The induced fluorescent light is then optically filtered by a configured filter arranged in emission filter wheel assembly 130 and the filtered induced fluorescent light is captured and recorded as an image via camera 122. Due to the even distribution of the excitation light intensity, the induced fluorescent light represents a true intensity level across the entire image.

The use of a homogenizing rod in a critically illuminated optical system can provide unique benefits over conventional critical optical systems. For example, throughputs of up to 100% can be obtained, with near perfect homogeneity. In contrast, conventional critically illuminated designs can only realize at best 64% efficiency, with a total intensity drop-off at the corners of the field of view. Due to the high throughput, LED systems can be used for confocal illumination, without significant exposure times or irregularities in the target field's illumination. In addition, while some "top hat" optics are presently available for single wavelengths, they cannot provide the desired efficiencies for conventional broadband solutions. Square fiber optics are also presently available, but are limited in diameter. This size limitation requires highly expensive and precise focusing optics in order to efficiently deliver both UV and NIR light into the end of the fiber. The embodiments discussed or envisioned herein overcome these standard problems associated with broadband illumination, and can be compatible with industry standard light guide systems. In addition, because the light exiting homogenizing rod is not highly divergent, large, fast optics are not required to ensure capture and collimation of the available light.

Embodiments discussed or envisioned herein can also provide unique benefits over conventional Koehler-based systems while providing a similar level of homogenization. As discussed above, conventional systems can use Koehler assemblies to homogenize light beams. Providing a similar level of homogenization in a critical illumination system—as can be done using homogenizing rods discussed or envisioned herein—provides many advantages over Koehler-based systems. The most obvious one is that the Koehler assemblies can be omitted, thereby saving a significant amount of money, especially because the collector and condenser lenses used to produce the Koehler illumination are expensive and often difficult to obtain. Another advantage is that a much simpler system results. Besides the simplicity obtained by emitting the Koehler assembly, conventional Koehler assemblies often require frequent aperture calibrations during use, calibrations that are not required in critical illumination systems.

Figure 14:
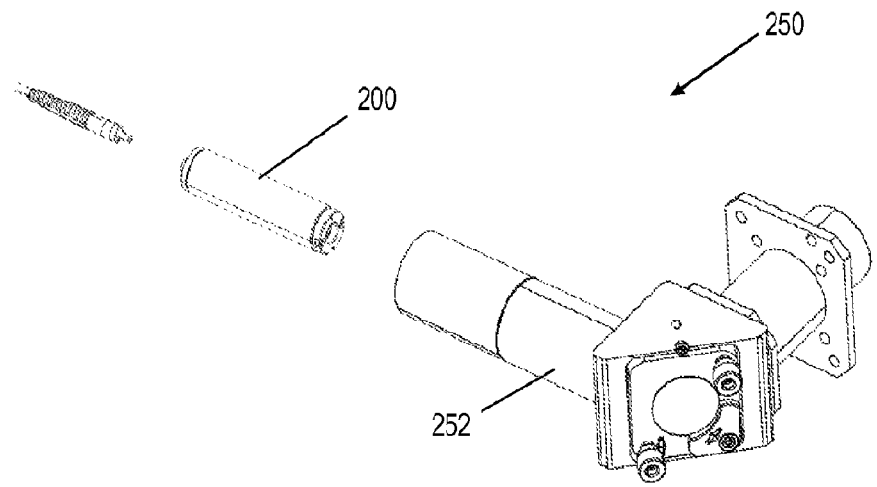
FIG. 14 illustrates an example embodiment of an excitation adapter incorporating features disclosed or envisioned herein.
Figure 15:
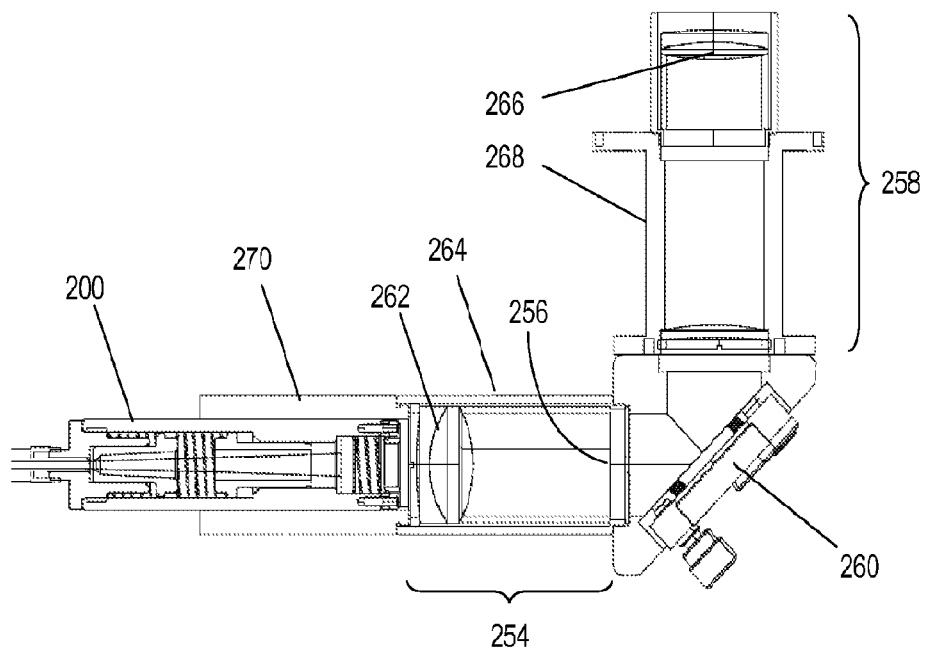
FIG. 15 is a cross-sectional view of the excitation adapter of FIG. 14.

FIGS. 14 and 15 depict an excitation adapter 250 according to one embodiment that incorporates a homogenizing rod. Excitation adapter 250 includes a critical illumination assembly 252 that receives the output beam from optic homogenizer 200. As shown in FIG. 15, critical illumination assembly 252 includes a collector assembly 254 that collects and focuses an input light beam onto a small aperture 256 and a condenser assembly 258 that further manipulates the focused light beam. A mirror assembly 260 is positioned between collector assembly 254 and condenser assembly 258 to change the direction of the optical axis as the light flows through critical illumination assembly 252. The output from the homogenized critical illumination assembly has an intensity that is very evenly distributed. Collector assembly 254 includes one or more collector lenses 262 positioned within a collector lens tube 264 and condenser assembly 258 includes one or more condenser lenses 266 positioned within a condenser lens tube 268.

To maximize efficiency, the lenses can be selected or designed such that the cross sectional size of the light signal output from excitation adapter 250 is substantially equal to the size of the field of view of the objectives/camera. Such a system can provide a light beam that entirely fills the field of view without any of the light being wasted by shining outside of it. But for ease of manufacturing, the cross sectional light signal size may alternatively be greater than the field of view. For example, in one embodiment, the cross sectional light signal size can be up to 10 percent larger than the field of view. Although this may allow a small amount of the light signal to shine outside the field of view, it also allows manufacturing tolerances to be loosened, which improves manufacturability.

Critical illumination assembly 252 includes an input port 270, in the form of a sleeve, for receiving and aligning optic homogenizer 200. Due to the positioning of optic homogenizer 200 in sleeve 270, the output light beam from optic homogenizer 200 becomes the input light beam of critical illumination assembly 252. Optic homogenizer 200 slides longitudinally into input port 270, which allows adjustment of the focal length of the light spots generated therein. As a result, the illumination can be finely focused at the sample plane by longitudinally moving optic homogenizer 200 within input port 270 while viewing the image at the sample plane. A securing mechanism secures optic homogenizer 200 in sleeve 270 once optic homogenizer 200 is at the desired longitudinal position. For example, in the depicted embodiment a pair of set screws (not shown) is used. In this assembled form, critical illumination assembly 252 transmits the initially homogenized signal output from optic homogenizer 200 to the microscope and, thus, the image plane.

As discussed above, conventional Koehler assemblies are used to homogenize light beams. However, the collector and condenser lenses used therein must be large and thick and have rigid tolerance levels to produce the even distribution from the generally Gaussian input signals. As such, these optic elements are expensive and can be difficult to obtain. Furthermore, conventional Koehler assemblies can require frequent calibration of apertures due to the extremely tight tolerances.

In contrast, the components of critical illumination assembly 252 can be smaller and have less rigid tolerance levels than conventional Koehler assemblies. Furthermore, the relaxed tolerances can result in less frequent aperture calibrations.

In addition, because the light exiting optic homogenizer 200 is not highly divergent, the light exiting optic homogenizer 200 does not require large, fast optics to ensure capture and collimation of all available light.

An HCI system similar to HCI system 100 was used to record fluorophore emission light induced by cells in a manner similar to that discussed above. An optic homogenizer similar to optic homogenizer 200 was used to produce a homogenized illumination light. The homogenizing rod used in the optic homogenizer was made of N-BK7 glass, had a length of 60 mm, and had square input and output end faces having edge lengths, respectively, of 1.5 mm and 5.0 mm so that the end face areas were respectively 2.25 mm$^2$ and 25.0 mm$^2$. For comparison purposes, the cells were imaged both with and without the optic homogenizer installed in the system. As such, the cells were excited and the induced fluorescence was imaged using both homogenized and non-homogenized excitation source light beams.

FIGS. 16A and 16B each show an array of 16 images 280 (280a-280p), 282 (282a-282p) respectively obtained using the non-homogenized and homogenized excitation source light beam in one HCI session. Each figure is a 4×4 array representing 16 stained tissue slides imaged in the imaging session. The 16 slides represented in FIG. 16A represent the same 16 slides as are represented in FIG. 16B. As depicted, images 282 produced using the homogenized excitation source light exhibit a more even distribution of light intensity than images 280 produced using the non-homogenized excitation source light. Because of the even distribution, various features of images 282 stand out more than on images 280, especially at the corners. In addition, correlating differences and similarities between images 282 is easier to accomplish than it is between images 280. All in all, images 282, produced using the homogenized excitation source light, are of higher quality and exhibit more even lighting, and can therefore produce more accurate results when analyzed.

Figure 17A:
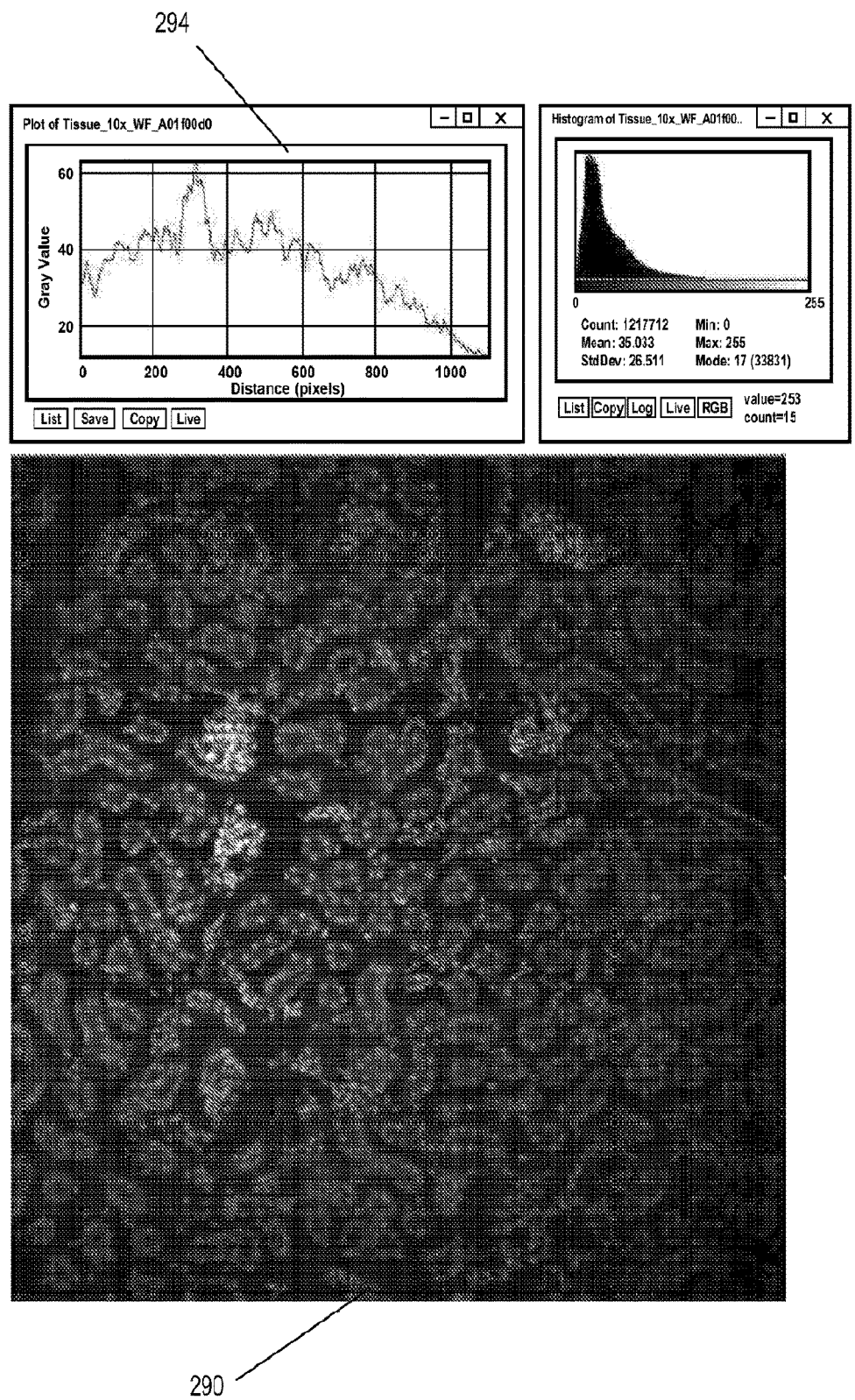
FIGS. 17A and 17B are further sample images.
Figure 17B:
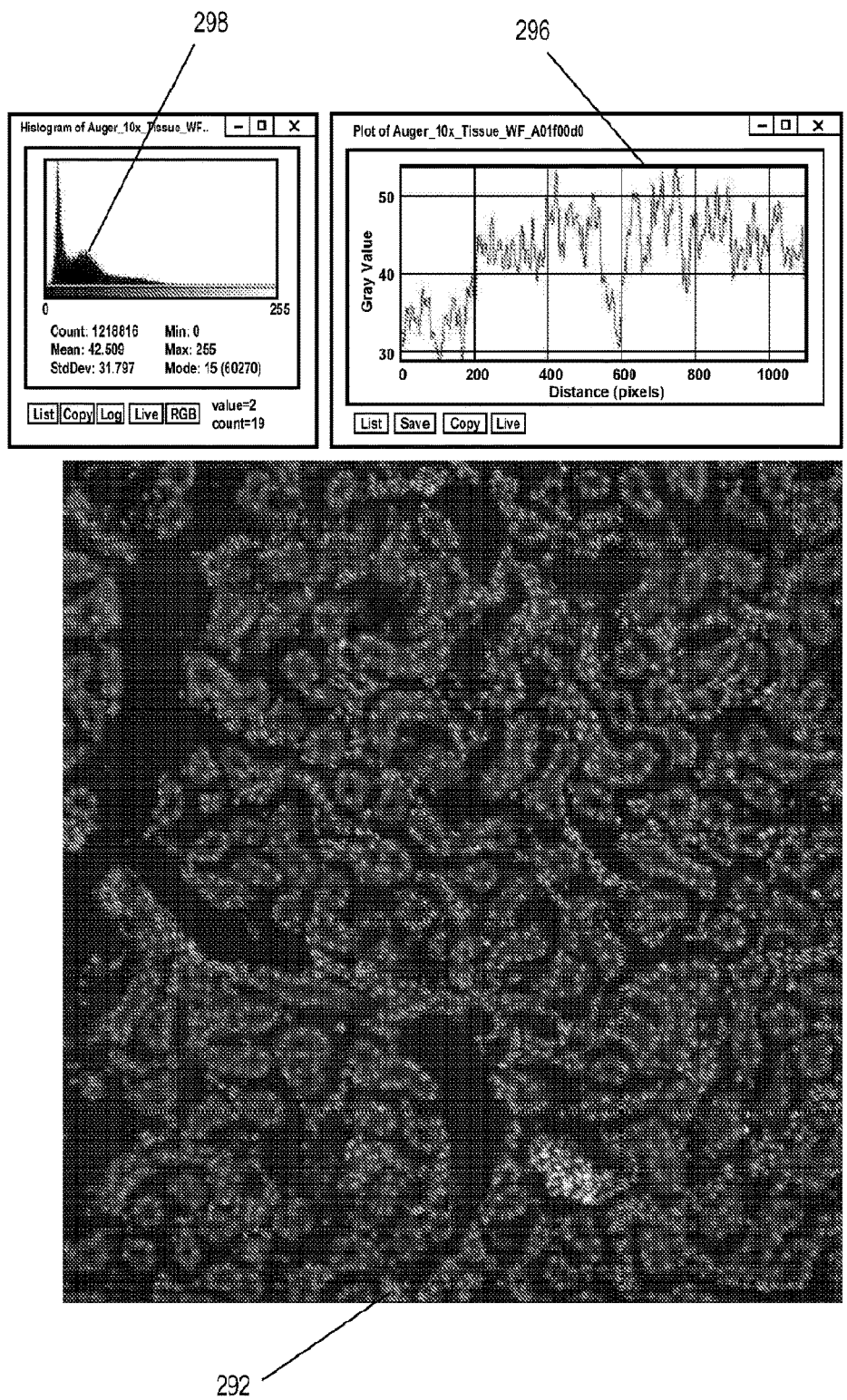

FIGS. 17A and 17B show images 290, 292 respectively obtained using the non-homogenized and homogenized excitation source light beam in another HCI session. Again, image 292 produced using the homogenized excitation source light exhibits a more even distribution of light intensity than image 290 produced using the non-homogenized excitation source light. And again, because of the even distribution, various features of image 292 stand out more than on image 290, especially at the corners.

Histograms associated with each image are also shown in FIGS. 17A and 17B. Histograms 294 and 296 were generated using the information respectively obtained from images 290 and 292. As shown in the figures, a bump 298 is evident in histogram 296 but is missing in histogram 294. For this particular test, the bump signifies the separation of signal and background. Thus, this particular condition was detected only when using the homogenized excitation source light—importantly, it was not detected when using the non-homogenized excitation source light.

Although the above discussion has been directed to using a homogenizing rod with a single light guide, it should be appreciated that the homogenizing rod can also be used to homogenize light received from multiple illumination sources and provide an evenly distributed illumination light into a tightly defined area with minimal modification. To receive multiple inputs, the input end face, output end face, and/or overall size of the homogenizing rod may need to be increased and/or otherwise modified. The multiple inputs can be merged into a light beam without any of the losses or expense typically required when using conventional systems. This is a significant and unique design which can replace many existing merging modules that rely on substantial arrangements of filters, lensing, and mirrors, resulting in substantial system improvement and cost savings.

In one embodiment for example, two or more fiber optic conduits, LEDs, light guides, laser diodes, and/or white light inputs can be uniformly joined by a homogenizing rod so that any of the joined light sources can be used at the same position, regardless of the desired input used.

In another embodiment, to emulate a multimode fiber a plurality of LED's, each corresponding to a different wavelength, can be secured to the input end face of the rod, either directly or indirectly, so as to provide the individual frequencies to the rod.

In another embodiment, a plurality of optic fibers can be input into the homogenizing rod. If desired, a conventional fiber optic connector can be used to properly space the optic fibers at the input end of the rod.

It is to be understood that features described with regard to the various embodiments herein may be mixed and matched in any combination without departing from the spirit and scope of the invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optic homogenizer configured to receive and homogenize a signal from an optic light guide having an end face, the optic homogenizer comprising:
   an adapter configured to receive the optic light guide;
   an optic window;
   a homogenizing rod positioned between the adapter and the optic window, the homogenizing rod extending longitudinally from an input end face to an output end face, an area of the output end face being 3-1000 times larger than an area of the input end face, the homogenizing rod tapering from the output end face to the input end face; and means for positioning the homogenizing rod so as to align the input end face of the homogenizing rod with the end face of the optic light guide and the output end face of the homogenizing rod with the optic window, wherein the input end face of the homogenizing rod abuts the end face of the optic light guide and the output end face of the homogenizing rod abuts the optic window.

2. The optic homogenizer recited in claim 1, further comprising a housing in which the adapter, the optic window, and the homogenizing rod are positioned.

3. The optic homogenizer recited in claim 1, wherein the input end face of the homogenizing rod securely presses against the end face of the optic light guide and the output end face of the homogenizing rod securely presses against the optic window.

4. The optic homogenizer recited in claim 1, wherein the area of the output end face of the homogenizing rod is at least eleven times larger than the area of the input end face of the homogenizing rod.

5. The optic homogenizer recited in claim 1, wherein the input and output end faces of the homogenizing rod are each shaped in the form of a square or rectangle.

6. The optic homogenizer recited in claim 1, wherein the means for positioning comprises a proximal slider and a distal slider, both sliders contacting the homogenizing rod.

7. The optic homogenizer recited in claim 1,
wherein the means for positioning comprises a proximal spring, a middle spring, and a distal spring, and
wherein the proximal, middle, and distal springs work in concert with a proximal slider and a distal slider to cause the input end face of the homogenizing rod to securely press against the end face of the optic light guide and the output end face of the homogenizing rod to securely press against the optic window.

8. A high content imaging (HCI) system comprising:
a stage configured to receive a plurality of biological cells;
an excitation light source that produces an excitation light; and
an optic homogenizer as recited in claim 1,
wherein the optic homogenizer receives the excitation light from the excitation light source and produces a homogenized excitation light therefrom that is used to image the plurality of biological cells at the stage.

9. The HCI system recited in claim 8, wherein the excitation light received by the optic homogenizer has a spot that is circular and the homogenized excitation light has a spot that is square or rectangular.

10. The HCI system recited in claim 9, wherein the spot size of the homogenized excitation light is about the same size as the imaged cells.

11. The HCI system recited in claim 8, wherein the optic homogenizer is slidable within a sleeve to focus the homogenized excitation light at the stage.

12. A method of assembling an optic homogenizer, comprising:
inserting a distal positioner, a middle spring, a proximal positioner, and a proximal spring, in that order, into a proximal end of a housing;
securing a light guide adapter to the proximal end of the housing;
inserting a homogenizing rod, an optic window, and a distal spring, in that order, into a distal end of the housing; and
securing a retention cap to the distal end of the housing.

13. The method recited in claim 12, further comprising inserting a light guide into the light guide adapter.

14. The method recited in claim 13, wherein the light guide is inserted into the light guide adapter before the light guide adapter is secured to the proximal end of the housing.

* * * * *